(12) United States Patent
Muren et al.

(10) Patent No.: US 8,886,368 B2
(45) Date of Patent: Nov. 11, 2014

(54) CONTROL OF UAV

(71) Applicant: Prox Dynamics AS, Hvalstad (NO)

(72) Inventors: Petter Muren, Slependen (NO); Dag Henning Paulsen, Voyenenga (NO)

(73) Assignee: Prox Dynamics AS, Hvalstad (NO)

(*) Notice: Subject to any disclaimer, the term of this patent is extended or adjusted under 35 U.S.C. 154(b) by 13 days.

(21) Appl. No.: 13/749,782

(22) Filed: Jan. 25, 2013

(65) Prior Publication Data
US 2014/0142784 A1 May 22, 2014

(30) Foreign Application Priority Data
Mar. 14, 2012 (NO) .................................. 20120297

(51) Int. Cl.
*B64C 19/00* (2006.01)
*G05D 1/00* (2006.01)
*G06F 3/0484* (2013.01)

(52) U.S. Cl.
CPC .............. *B64C 19/00* (2013.01); *G05D 1/0016* (2013.01); *G05D 1/0038* (2013.01); *G06F 3/04842* (2013.01)
USPC ... 701/3; 701/2; 701/301; 701/16; 455/556.1; 244/76 R; 244/180; 244/190; 244/175

(58) Field of Classification Search
CPC .................................. G05D 1/00; B64C 19/00
USPC .......... 244/175, 190, 76 R, 180; 701/16, 2, 3, 701/301; 455/556.1
See application file for complete search history.

(56) References Cited

U.S. PATENT DOCUMENTS

| | | | |
|---|---|---|---|
| 7,006,881 B1* | 2/2006 | Hoffberg et al. | 700/83 |
| 7,195,200 B2* | 3/2007 | Yamane | 244/76 R |
| 7,555,372 B2* | 6/2009 | Dwyer | 701/16 |
| 8,553,935 B2* | 10/2013 | Mandella et al. | 382/103 |
| 2006/0195232 A1* | 8/2006 | Obradovich | 701/1 |
| 2006/0200258 A1* | 9/2006 | Hoffberg et al. | 700/86 |
| 2007/0106473 A1* | 5/2007 | Bodin et al. | 701/301 |
| 2007/0244608 A1* | 10/2007 | Rath et al. | 701/3 |
| 2007/0260364 A1* | 11/2007 | Dwyer | 701/3 |
| 2008/0280640 A1* | 11/2008 | Wedel et al. | 455/556.1 |
| 2010/0084513 A1* | 4/2010 | Gariepy et al. | 244/190 |
| 2011/0200974 A1* | 8/2011 | Gluck | 434/30 |
| 2011/0288696 A1* | 11/2011 | Lefebure | 701/2 |
| 2012/0280087 A1* | 11/2012 | Coffman et al. | 244/175 |
| 2013/0021475 A1* | 1/2013 | Canant et al. | 348/144 |
| 2014/0067162 A1* | 3/2014 | Paulsen et al. | 701/2 |

FOREIGN PATENT DOCUMENTS

EP  2256571 A2  12/2010

OTHER PUBLICATIONS

Norwegian Search Report dated Oct. 12, 2012 for Norwegian Application No. 20120297, filed on Mar. 14, 2012 consisting of 2 pages.
Terrence Fong et al., Novel interfaces for remote driving: gesture, haptic and PDA, Proceedings of SPIE vol. 4195 (2001), XP009118241.
International Search Report and Written Opinion dated Apr. 16, 2013 for International Application Serial No. PCT/EP2013/051489, International Filing Date: Jan. 25, 2013 consisting of 12 pages.

* cited by examiner

*Primary Examiner* — Thomas G Black
*Assistant Examiner* — Wae Louie
(74) *Attorney, Agent, or Firm* — Christopher & Weisberg, P.A.

(57) ABSTRACT

The present invention discloses a control stick for controlling an UAV formed by a bar with buttons on the bar head and a GUI displaying airplane like icons providing feedback of current steering control status of a UAV.

10 Claims, 1 Drawing Sheet

CONTROL OF UAV

CROSS-REFERENCE TO RELATED APPLICATION

This application is related to and claims priority from Norwegian Patent Application Serial No. 20120297, filed Mar. 14, 2012, entitled CONTROL OF UAV, the entirety of which is incorporated herein by reference.

STATEMENT REGARDING FEDERALLY SPONSORED RESEARCH OR DEVELOPMENT n/a

FIELD OF THE INVENTION

The embodiments herein relate to controlling an Unmanned Aerial Vehicle (UAV).

BACKGROUND OF THE INVENTION

Modern warfare and law enforcement are characterized by an increasing need for up-to-date situational awareness. To track down, or to protect against, criminals, paramilitary forces or terrorists, law enforcement personnel and soldiers often have an immediate need for information about what is around the next corner or over the hill.

Hostile forces frequently hide themselves from view or exploit the local terrain to gain tactical advantage or escape from pursuers. In the presence of hostile forces, a simple brick wall, barbed wire fence, a body of water, buildings or even a large open area can be an insurmountable obstacle when time is of the essence and tactical resources are unavailable. An active or undetected threat can make the situation dangerous.

Visible indications, noises or predictable actions can reveal friendly forces and put them at risk. Stealth and surprise, however, are important elements that can give a tactical advantage. An Unmanned Aerial Vehicles (UAV) is an aircraft with no pilot on board. UAVs can be remote controlled aircraft (e.g. flown by a pilot at a ground control station) or can fly autonomously based on pre-programmed flight plans or more complex dynamic automation systems. An UAV may also be referred to as a drone. UAVs equipped with video cameras that transmit back live pictures allow their operator to perform surveillance tasks and gather information from a safe position without exposing themselves.

Traditionally an UAV is operated by a joystick. Most joysticks are two-dimensional, having two axes of movement (similar to a mouse), but one and three-dimensional joysticks do exist. A joystick is generally configured so that moving the stick left or right signals movement along the X axis, and moving it forward (up) or back (down) signals movement along the Y axis. In joysticks that are configured for three-dimensional movement, twisting the stick left (counterclockwise) or right (clockwise) signals movement along the Z axis. These three axes—X, Y, and Z—are, in relation to an aircraft, roll, pitch, and yaw.

A traditional joystick has a joint connected to a base, where the movements of the joystick relative to the base impact the movements of the aircraft correspondingly. The position of the joystick gives the operator feedback of the current control signal impact on the aircraft.

However, small drones adjusted to be controlled by operational personnel in the fields will typically be stored in UAV kits with limited space, and a traditional joystick with a joint would not be applicable because it would require too much space and the joint would be a weak point exposed to damages when operated in the field. For being operated properly, the base of a traditional joystick should be placed horizontally and stationary, which would not be applicable for a portable remote operating in the field. A one-hand joystick would in this case be more applicable with buttons on the joystick head with pairs of buttons controlling the forward/backward speed (pitch), left/right speed (roll) and left/right rotation (yaw) respectively. However, the spatial position of the joystick would in this case not give feedback to the operator about current commended speed. Thus, there is need for a feedback system for controlling an UAV not requiring a joint being independent of the spatial position of the joystick.

SUMMARY OF THE INVENTION

An object of embodiments herein is therefore to provide an improved remote control for controlling an aircraft.

According to a first aspect, the object is achieved by a method for displaying steering control status of an aircraft on a display by means of an aircraft symbol and a number of directional speed symbols, wherein the aircraft symbol is shaped to indicate the longitudinal and lateral axis passing through origin or center point of the aircraft symbol and the forward direction of the aircraft, and the directional speed is stepwise shifted by a pair of opposite effecting buttons on a control device, including the steps of displaying one or more directional speed symbols positioned on the longitudinal or lateral axis or between two the longitudinal or lateral axis, wherein the number of directional speed symbols and position relative to the aircraft symbol is depending on current steering control status, and when pushing one of the pair of opposite effecting buttons, adding or removing one of the directional speed symbols.

The directional speed symbols may be bars and the aircraft symbol may be an airplane symbol seen from above where an airplane nose on the plane symbol indicates the forward direction of the aircraft.

In some embodiments, one push on a first button of the pair of opposite effecting buttons generates a speed shift in the forward direction of the aircraft, one push on a second button of the pair of opposite effecting buttons generates a speed shift in the backward direction of the aircraft. The bars may be positioned on said longitudinal axis, and the directional speed that the respective bars represent may be increasing with the distance of the bar's position to the origin.

In some embodiments, one push on a first button of the pair of opposite effecting buttons generates a speed shift in the left direction of the aircraft, one push on a second button of the pair of opposite effecting buttons generates a speed shift in the right direction of the aircraft. The bars may be positioned on said lateral axis, and the directional speed that the respective bars represent may be increasing with the distance of the bar's position to the origin.

In some embodiments, one push on a first button of the pair of opposite effecting buttons generates a rotational speed shift in the clockwise direction of the aircraft, one push on a second button of the pair of opposite effecting buttons generates a rotational speed shift in the counterclockwise direction of the aircraft and the bars may be positioned between said lateral and longitudinal axis.

According to a second aspect, the object is achieved by a remote control for controlling an aircraft comprising a control stick with a pair of opposite effecting buttons adjusted to stepwise shifting the directional speed and a graphical user interface, GUI, adjusted to display steering control status of the aircraft by means of an aircraft symbol and a number of directional speed symbols, wherein the aircraft symbol is shaped to indicate the longitudinal and lateral axis passing through origin of the aircraft symbol and the forward direction of the aircraft, wherein the GUI is further adjusted to display one or more directional speed symbols positioned on the longitudinal or lateral axis or between the longitudinal or lateral axis, wherein the number of directional speed symbols and position relative to the aircraft symbol is depending on current steering control status, and to add or remove one of the directional speed symbols when one of the pair of opposite effecting buttons are activated.

The directional speed symbols may be bars and the aircraft symbol may an airplane symbol seen from above where an airplane nose on the plane symbol indicates the forward direction of the aircraft.

In some embodiments, one push on a first button of the pair of opposite effecting buttons generates a speed shift in the forward direction of the aircraft, one push on a second button of the pair of opposite effecting buttons generates a speed shift in the backward direction of the aircraft. The bars may be positioned on said longitudinal axis, and the directional speed that the respective bars represent may be increasing with the distance of the bar's position to the origin.

In some embodiments, one push on a first button of the pair of opposite effecting buttons generates a speed shift in the left direction of the aircraft, one push on a second button of the pair of opposite effecting buttons generates a speed shift in the right direction of the aircraft. The bars may be positioned on said lateral axis, and the directional speed that the respective bars represent may be increasing with the distance of the bar's position to the origin.

In some embodiments, one push on a first button of the pair of opposite effecting buttons generates a rotational speed shift in the clockwise direction of the aircraft, one push on a second button of the pair of opposite effecting buttons generates a rotational speed shift in the counterclockwise direction of the aircraft and the bars are positioned between said lateral and longitudinal axis.

Embodiments herein afford many advantages, of which a non-exhaustive list of examples follows:

An advantage of the embodiments herein is that the remote control is robust, it does not require a large amount of maintenance. Another advantage is that the remote control according to the embodiments herein is easy to use.

The embodiments herein are not limited to the features and advantages mentioned above. A person skilled in the art will recognize additional features and advantages upon reading the following detailed description.

BRIEF DESCRIPTION OF THE DRAWINGS

The following detailed description of the embodiments herein is accompanied by drawings in order to make it more readily understandable. In the drawings.

The drawings are not necessarily to scale and the dimensions of certain features may have been exaggerated for the sake of clarity. Emphasis is instead placed upon illustrating the principle of the embodiments herein.

DETAILED DESCRIPTION OF THE INVENTION

In the following, the embodiments herein will be discussed and example embodiments described by referring to the accompanying drawings.

The embodiments herein disclose a remote control stick for controlling an UAV formed by a bar with buttons on the bar head and airplane like icons on a display providing feedback of current impact of the UAV.

Figure 1:
FIG. 1 shows a snapshot of a Graphical User Interface (GUI) with an example of a current commanded speed symbol according to the embodiments herein.
Figure 2:
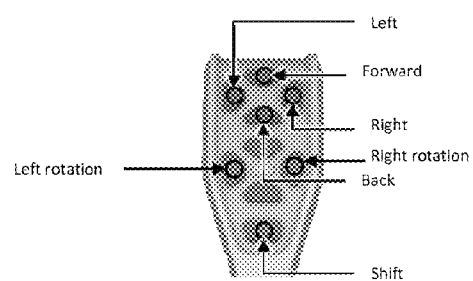
FIG. 2 shows an example of a joystick head used in connection with the embodiments herein.

FIG. 1 shows a snapshot of an example GUI comprising a video picture captured by a camera comprised in an UAV (not shown) and different navigation and information symbols on both sides. The upper left symbol indicates the state of the current control signal corresponding to the series of pushes on the different control buttons on a control stick, as exemplified in FIG. 2.

The embodiments herein replace the traditional operator feedback of current directional control signal in terms of the position of the joystick with a symbol on a GUI screen. The symbol comprises a static part, e.g. formed as an aircraft and a number of dynamic bars positioned and appearing according to current steering control status associated with activation of buttons on the control stick. Different combinations of activation or pushes on one or several buttons corresponding to give the UAV commands to use a certain directional speed respectively correspond to a specific version of the symbol shown on the screen, which intuitively will give the operator of the remote control information about the current commanded speed given to the UAV. The variations of the symbol mainly effect the number of bars in front of, behind, to the left and to the right of the center symbol. Pairs of buttons on the joystick may offset each other, so that e.g. one push on the left button will cancel the effect of one previous push on the right button, and a possible bar on the right side of the center symbol will be removed. The back and forward button will have the same relation, and also possible rotation left and rotation right button.

Table 1 shows examples of bars at full deflection corresponding to respective directional speed options when buttons on the remote control is activated. Row 1 represents activation of the forward button 203 which transmits a command of forward speed to the UAV, and the symbol shows a commanded speed at maximum forward ground speed. In this example, the two first bars each represent one sixth of maximum forward speed, while the third and the fourth bar represent one third of maximum forward speed as disclosed in the right column. At maximum forward speed the symbol will show four bars in front of the center symbol positioned on the longitudinal axis of the symbol, which in this case is a plane seen from above. The number of bars and the associated additional commanded left and right sideway speed is disclosed in row 2 and 3. The bars of the left and right sideway speed are positioned on the lateral axis of the symbol. Row 4 discloses the bars associated with commanded left rotation. These bars are located between 9 and 12 o'clock in a clockwise relation to the plane, i.e. between the longitudinal and lateral axis of the symbol. Each bar represents 10 degrees per second. The corresponding bars for the commanded right rotation are disclosed in row 5, and are located between 12 and 15 o'clock in a clockwise relation to the plane. Row 6 discloses the commanded backward speed, and row 7 discloses the symbol for an UAV in hover, with no commanded speed in any direction, which would be the initial situation at flight start-up.

TABLE 1

| Symbol | Term | Description | |
|---|---|---|---|
|  | Commanded | Commanded forward ground speed. | |
|  | Forward | 1 bar: | Max fw speed/6 |
|  | Speed | 2 bars: | Max fw speed/3 |
|  |  | 3 bars: | 2*Max fw speed/3 |
|  |  | 4 bars: | Max fw speed |

TABLE 1-continued

| Symbol | Term | Description |
|---|---|---|
| | Commanded Left Sideways Speed | Commanded left sideways ground speed.<br>1 bar: 0.5 m/s (1 kts)<br>2 bars: 1 m/s (2 kts) |
| | Commanded Right Sideways Speed | Commanded right sideways ground speed.<br>1 bar: 0.5 m/s (1 kts)<br>2 bars: 1 m/s (2 kts) |
| | Commanded Left Rotation | Commanded left rotation.<br>1 bar: 10°/s<br>2 bars: 20°/s<br>3 bars: 30°/s |
| | Commanded Right Rotation | Commanded right rotation.<br>1 bar: 10°/s<br>2 bars: 20°/s<br>3 bars: 30°/s |
| | Commanded Backward Speed | Commanded backwards ground speed.<br>1 bar: 1 m/s (2 kts) |
| | Hover (no commanded speed) | No commanded speed in any direction. NUAV will maintain current GPS position. |

The directionally independent symbols illustrated in table 1 can of course be combined according to the different commanded speeds currently applied on the UAV. Table 2 illustrates three examples of such combinations. Row 1 shows an example of the symbol with bars corresponding to 2*Max fw speed/3 and 0.5 m/s (1 kts) right sideways ground speed. Row 2 shows an example of the symbol with bars corresponding to 0.5 m/s (4 kts) left sideway ground speed and 30°/s right rotation, while row 3 represents the symbol at 0.5 m/s (1 kts) left sideways ground speed and 30°/s left rotation. All different combinations of the symbol representing amounts of sideway speeds, backward/forward speed and left/right rotation speed are imaginable, and can be derived from table 1 and the above discussions.

TABLE 2

| Symbol | Term | Description |
|---|---|---|
| | Commanded Forward Speed and Right Sideways Speed | 2*Max fw speed/3<br>0.5 m/s (1 kts) right sideways ground speed |
| | Commanded Left Sideways Speed and Right Rotation | 0.5 m/s (1 kts) left sideways ground speed<br>30°/s right rotation |
| | Commanded Right Sideways Speed and Left Rotation | 0.5 m/s (1 kts) left sideways ground speed<br>30°/s left rotation |

As already indicated, there are different button combinations starting from the hover state leading to the same commanded speed state and corresponding symbol. Table 3 shows one example of a series of button pushes leading to the state shown in row 1 of table 2:

TABLE 3

| Symbol | Button | State |
|---|---|---|
| | Initial state | Zero speed in all directions |
| | Forward | Max fw speed/6 |

TABLE 3-continued

| Symbol | Button | State |
|---|---|---|
| | Forward | Max fw speed/3 |
| | Left | Max fw speed/3<br>0.5 m/s (1 kts) left sideways ground speed |
| | Right | Max fw speed/3 |
| | Right | Max fw speed/3<br>0.5 m/s (1 kts) right sideways ground speed |
| | Forward | 2*Max fw speed/3<br>0.5 m/s (1 kts) right sideways ground speed |

The above description discloses different examples of the present invention for illustrative purposes. A person skilled in the art would realize a variety of different combinations of symbols, symbol designs and corresponding button series all being within the scope of the present invention.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

What is claimed is:

1. A method for controlling an aircraft with a remote control having at least one pair of opposite effecting buttons, the method comprising:

displaying a speed indicator including an aircraft symbol and one or more directional speed symbols positioned relative to the aircraft symbol, the aircraft symbol being shaped to indicate a longitudinal axis and a lateral axis passing through an origin of the aircraft symbol and a forward direction of the aircraft, the one or more directional speed symbols being positioned on the longitudinal axis of the aircraft symbol, on the lateral axis of the aircraft symbol, or between the longitudinal axis of the aircraft symbol and the lateral axis of the aircraft symbol, the number of directional speed symbols and position relative to the aircraft symbol depending on a current steering control status; and when pushing one of the at least one pair of opposite effecting buttons, adding or removing one of the directional speed symbols, the directional speed being stepwise shifted by at least one of the at least one pair of opposite effecting buttons on the remote control.

2. The method according to claim 1, wherein the one or more directional speed symbols are bars and the aircraft symbol is an airplane symbol seen from above where an airplane nose on the plane symbol indicates the forward direction of the aircraft.

3. The method according to claim 2, wherein a push on a first button of the at least one pair of opposite effecting buttons generates a speed shift in the forward direction of the aircraft, a push on a second button of the at least one pair of opposite effecting buttons generates a speed shift in a backward direction of the aircraft, the bars being positioned on the longitudinal axis of the aircraft symbol at a distance to the origin of the aircraft symbol, and a directional speed of the aircraft being represented by the distance of the one or more bars from the origin of the aircraft symbol, with the directional speed of the aircraft increasing with the distance of the one or more bars from the origin of the aircraft symbol.

4. The method according to claim 2, wherein a push on a first button of the at least one pair of opposite effecting buttons generates a speed shift in a left direction of the aircraft, a push on a second button of the at least one pair of opposite effecting buttons generates a speed shift in a right direction of the aircraft, the bars being positioned on the lateral axis of the aircraft symbol at a distance to the origin of the aircraft symbol, and a directional speed of the aircraft being represented by the distance of the one or more bars from the origin of the aircraft symbol, with the directional speed of the aircraft increasing with the distance of the one or more bars from the origin of the aircraft symbol.

5. The method according to claim 2, wherein a push on a first button of the at least one pair of opposite effecting buttons generates a rotational speed shift in a clockwise direction of the aircraft, a push on a second button of the at least one pair of opposite effecting buttons generates a rotational speed shift in a counterclockwise direction of the aircraft, the bars being positioned between the lateral axis of the aircraft symbol and the longitudinal axis of the aircraft symbol.

6. A remote control for controlling an aircraft, comprising:
a control stick with at least one pair of opposite effecting buttons adjusted to stepwise shifting a directional speed;
a graphical user interface configured to indicate a steering control status of an aircraft by displaying a speed indicator including an aircraft symbol and one or more directional speed symbols positioned relative to the aircraft symbol, the aircraft symbol being shaped to indicate a longitudinal axis and a lateral axis each passing through an origin of the aircraft symbol and a forward direction of the aircraft,
the graphical user interface further configured to display the one or more directional speed symbols positioned on the longitudinal axis, on the lateral axis, or between the longitudinal axis and the lateral axis, a number of the one or more directional speed symbols being displayed and the position of the one or more directional speed symbols relative to the aircraft symbol being dependent on a current steering control status, and the graphical user interface further configured to add or remove one of the one or more directional speed symbols when one of the at least one pair of opposite effecting buttons is activated.

7. The remote control according to claim 6, wherein the one or more directional speed symbols is a bar and the aircraft symbol is an airplane symbol seen from above where an airplane nose on the plane symbol indicates the forward direction of the aircraft.

8. The remote control according to claim 7, wherein a push on a first button of the at least one pair of opposite effecting buttons generates a speed shift in the forward direction of the aircraft, a push on a second button of the at least one pair of opposite effecting buttons generates a speed shift in a backward direction of the aircraft, the bars being positioned on the longitudinal axis of the aircraft symbol at a distance to the origin of the aircraft symbol, and a directional speed of the aircraft being represented by the distance of the one or more bars from the origin of the aircraft symbol, with the directional speed of the aircraft increasing with the distance of the one or more bars from the origin of the aircraft symbol.

9. The remote control according to claim 7, wherein a push on a first button of the at least one pair of opposite effecting buttons generates a speed shift in a left direction of the aircraft, a push on a second button of the at least one pair of opposite effecting buttons generates a speed shift in a right direction of the aircraft, the bars being positioned on the lateral axis of the aircraft symbol at a distance to the origin of the aircraft symbol, and the directional speed of the aircraft being represented by the distance of the one or more bars from the origin of the aircraft symbol, with the directional speed of the aircraft increasing with the distance of the one or more bars from the origin of the aircraft symbol.

10. The remote control according to claim 6, wherein a push on a first button of the at least one pair of opposite effecting buttons generates a rotational speed shift in a clockwise direction of the aircraft, a push on a second button of the pair of opposite effecting buttons generates a rotational speed shift in a counterclockwise direction of the aircraft, the bars being positioned between the lateral axis of the aircraft symbol and the longitudinal axes axis of the aircraft symbol.

* * * * *